United States Patent
Vierk et al.

(10) Patent No.: US 10,060,485 B2
(45) Date of Patent: Aug. 28, 2018

(54) COMPOSITE FRICTION AND DOG CLUTCH

(71) Applicant: BorgWarner Inc., Auburn Hills, MI (US)

(72) Inventors: David T. Vierk, Mokena, IL (US); Steven J. Kowal, Naperville, IL (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/114,161

(22) PCT Filed: Jan. 28, 2015

(86) PCT No.: PCT/US2015/013307
§ 371 (c)(1),
(2) Date: Jul. 26, 2016

(87) PCT Pub. No.: WO2015/116691
PCT Pub. Date: Aug. 6, 2015

(65) Prior Publication Data
US 2016/0369852 A1 Dec. 22, 2016

Related U.S. Application Data

(60) Provisional application No. 61/933,594, filed on Jan. 30, 2014.

(51) Int. Cl.
*F16D 21/00* (2006.01)
*F16D 13/46* (2006.01)
(Continued)

(52) U.S. Cl.
CPC .............. *F16D 21/00* (2013.01); *F16D 11/00* (2013.01); *F16D 11/14* (2013.01); *F16D 13/38* (2013.01);
(Continued)

(58) Field of Classification Search
None
See application file for complete search history.

(56) References Cited

U.S. PATENT DOCUMENTS 3,063,529 A * 11/1962 Cook .................... F16D 23/04
192/48.5
4,349,091 A 9/1982 Miyake et al.
(Continued)

FOREIGN PATENT DOCUMENTS

JP H04113030 A 4/1992

*Primary Examiner* — Mark A Manley
(74) *Attorney, Agent, or Firm* — Miller, Matthias & Hull LLP

(57) ABSTRACT

A composite clutch (110) is adapted to transmit an operational range of torques (60) from a driving member (118) to a driven member (122). The composite clutch (110) incorporates both of a friction clutch assembly (124) and a dog clutch assembly (126), each assembly adapted to address one of two segments (62, 68) of the operational range of torques (60). The clutch (110) further includes a spring-loaded detent system (180) configured to control transition (66) between the two segments (62, 68) of operational ranges of torques (60). The friction clutch assembly (124) includes first friction clutch elements (128) coupled to the driving member (118) and second friction clutch elements (132) coupled to the driven member (122) for providing torque control within the lower operational range of torques (64). The dog clutch assembly (126) includes a first dog clutch element (136) coupled to the driving member (118) and a second dog clutch element (138) coupled to the driven member (122), in which the first and second dog clutch elements (136, 138) are configured to mechanically lock together during the higher operational range of torques (70).

15 Claims, 2 Drawing Sheets

(51) Int. Cl.
*F16D 23/00* (2006.01)
*F16D 25/061* (2006.01)
*F16D 25/0635* (2006.01)
*F16D 11/14* (2006.01)
*F16D 13/38* (2006.01)
*F16D 11/00* (2006.01)

(52) U.S. Cl.
CPC ............ F16D 13/46 (2013.01); F16D 23/00 (2013.01); *F16D 25/061* (2013.01); *F16D 25/0635* (2013.01); *F16D 2011/008* (2013.01)

(56) References Cited

U.S. PATENT DOCUMENTS

| | | | |
|---|---|---|---|
| 4,811,825 A | 3/1989 | Christian et al. | |
| 4,830,159 A * | 5/1989 | Johnson | F16D 23/06 192/53.32 |
| 5,339,936 A | 8/1994 | Lauer et al. | |
| 5,992,592 A | 11/1999 | Showalter | |
| 6,250,446 B1 * | 6/2001 | Leite | F16D 11/14 192/53.35 |
| 6,832,674 B2 | 12/2004 | Blair et al. | |
| 6,966,805 B1 | 11/2005 | Caldwell | |
| 7,101,306 B2 | 9/2006 | Blair et al. | |
| 2008/0141962 A1 | 6/2008 | Borraccia et al. | |
| 2011/0155530 A1 | 6/2011 | Vierk et al. | |
| 2013/0267372 A1 * | 10/2013 | Mellet | F16H 3/62 475/276 |
| 2013/0267373 A1 * | 10/2013 | Mellet | F16H 3/62 475/278 |

* cited by examiner

COMPOSITE FRICTION AND DOG CLUTCH

CROSS-REFERENCE TO RELATED APPLICATION

This application is an International Patent Application claiming priority under 35 U.S.C. § 119(e) to US Provisional Patent Application Ser. No. 61/933,594 filed on Jan. 30, 2014.

FIELD OF THE DISCLOSURE

The present disclosure relates generally to composite friction and dog clutches configured for use in transmissions adapted for transmitting torque in vehicles, and more particularly to improvements for enhancing the operability of such composite clutches.

BACKGROUND OF THE DISCLOSURE

Various types of clutches are used to transmit torque in vehicles. In a vehicle having an automatic transmission, for example, multiple clutches are used to engage or disengage selected gearsets in real time to obtain desired gear ratios. The primary clutches provided for this purpose are generally formed of friction plate clutches that include a plurality of inner or drive plates splined to a rotatable hub. A housing or case is coaxially aligned with the hub and supported for rotation independently of the hub. A plurality of outer or driven plates are splined to the housing or case and are interposed between the drive plates, such that the drive and driven plates are alternately arranged on a common axis. The drive plates generally include a friction material on one or both sides of the plates. An actuator may include a hydraulic piston adapted to apply a force that presses the drive and driven plates into engagement, thereby permitting torque to be transferred from the hub to the housing.

It is also known to utilize a mechanical locking clutch, such as a dog clutch, in combination with the described friction plate clutch. The dog clutch offers a positive lock of drive and driven members, without risk of slippage while under full torque loads upon full clutch engagement. Such dog clutches provide opportunities for reducing the numbers of plates used in the friction plate clutch to achieve a maximum desired torque. Such plate reduction is particularly pertinent to times when the clutch is unengaged and idling, as then the plates tend to generate a parasitic drag torque with resultant undesirable heat and wear. The latter occurs due to viscous shearing action between drive and driven plates that are often rotating at different speeds relative to one another. Such drag torque adversely affects vehicle fuel economy, and the use of excessive numbers of plates can exacerbate this problem.

Synchronizing clutches that employ both friction plates and dog or mechanical connection are well known. U.S. Publication 2011/0155530 A1, for example, discloses a composite clutch utilizing both friction and dog clutch elements. The improvements noted and disclosed herein may, however, improve operational characteristics associated with transitioning between friction and dog clutch operating modes with respect to such composite clutches.

SUMMARY OF THE DISCLOSURE

In accordance with one aspect the disclosure, a composite clutch is provided for transmitting an operational range of torques from a driving member to a driven member. The composite clutch incorporates both friction and dog clutch assemblies configured to effectively control transition between two distinct operational ranges of torques. The friction clutch assembly includes first friction clutch elements coupled to the driving member and second friction clutch elements coupled to the driven member for torque control within a first lower operational range of torques. The dog clutch assembly includes a first dog clutch element coupled to the driving member and a second dog clutch element coupled to the driven member, in which the first and second dog clutch elements are mechanically locked together during a second higher operational range of torques, and in which transition from first to second operational range of torques may be effectively controlled by a spring-loaded detent system.

In accordance with another aspect, an actuator assembly is operatively coupled to both the friction clutch assembly and the dog clutch assembly to sequentially move the first and second friction clutch elements from unengaged to torque transmitting positions, and then to move the first and second dog clutch elements from disengaged to engaged positions.

In accordance with yet another aspect of the disclosure, a composite clutch for transmitting an operational range of torques from a driving member to a driven member incorporates a dog clutch assembly including a first dog clutch element coupled to the driving member, a second dog clutch element coupled to the driven member, a spring loaded detent system, and an actuator assembly. The actuator assembly is operatively coupled to the dog clutch assembly to selectively force the first dog clutch element against and beyond a spring loaded detent system to cause the first and second dog clutch elements to move from a disengaged to an engaged position.

In accordance with yet another aspect of the disclosure, a composite clutch for transmitting an operational range of torques from a driving member to a driven member includes a friction clutch assembly, a dog clutch assembly, an actuator assembly, and a spring-loaded detent system. The dog clutch assembly includes first and second dog clutch elements configured to be axially moved together to create a mechanical lock between the driving member and the driven member. Each of the first and second dog clutch elements is defined by cooperating annular faces having V-grooves adapted to interlock and to thereby enhance the mechanical locking aspect of the dog clutch elements whenever axially pressed together by the actuator assembly under a second higher portion of the operational range of torques.

These and other aspects and features of the disclosure will become more apparent upon reference to the following detailed description and accompanying drawings.

Figure 1:
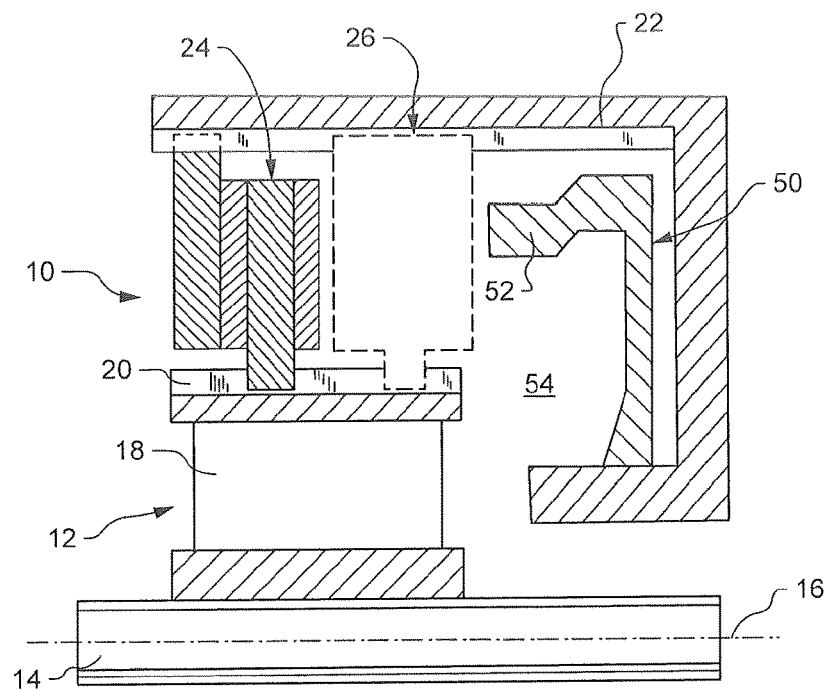
FIG. 1 is a schematic representation of one embodiment of a composite clutch that be constructed according to the present disclosure.

The various illustrative embodiments of the present disclosure, as depicted in the drawings and described in detail herein, are susceptible to modifications and alternative constructions. As such, numerous equivalent constructions may fall within the spirit and scope of the present disclosure.

DETAILED DESCRIPTION

FIG. 1 provides a schematic representation of a composite clutch 10, in an automatic transmission 12. It is to be understood that the automatic transmission 12 represents only one potential application of the composite clutch 10. Other applications in a vehicle, machine, machine tool, or/or even other devices may also advantageously employ the disclosed composite clutch 10, as will be readily appreciated by one of ordinary skill in the art.

As shown, the transmission 12 may include a drive shaft 14 adapted to rotate about an axis 16, which is itself powered by the motive force of an engine (not shown) in a vehicle (also not shown). A hub 18 is attached to and rotates with the drive shaft 14. The hub 18 may be provided as a simple annular flange coupled to the drive shaft 14, or the hub may be configured to provide additional features or capabilities, such as a one-way clutch (not shown). An exterior peripheral surface of the hub 18 is formed with splines 20. The transmission 12 may also include a case or housing 22 which is mounted coaxially with the drive shaft 14 and may be supported for rotation about the axis 16 independently of the drive shaft 14. According to this embodiment, the drive shaft 14 is the driving or input member while the housing 22 is the driven or output member.

Continuing reference to FIG. 1, the composite clutch 10 is provided to transfer torque from the hub 18 to the housing 22. The composite clutch 10 includes a friction clutch assembly 24 and a dog clutch assembly 26, the two assemblies being coaxially arranged for operation in series about the axis 16. The friction clutch assembly 24 may include sets of first and second friction elements that may be placed in torque transfer engagement. For example, as better shown in FIG. 2, one or more inner friction discs 28 may be splined to the hub 18' at splines 20'. Each inner friction disc 28 may include friction pads 30 on both sides of the plate. Alternatively, only one side of each inner friction disc 28 may include a friction pad 30. Additionally, one or more outer pressure plates 32 may be splined to the housing 22 at splines 23 such that each pressure plate 32 is disposed adjacent an inner friction discs 28. The respective inner and outer discs and plates 28, 32 (only one of each being schematically shown) are adapted to slide axially with respect to one another while remaining attached to and rotatable with the hub 18 and housing 22, respectively. Accordingly, the discs and plates 28, 32 are movable between an unengaged position, in which the discs and plates 28, 32 do not contact each other, and a torque transmitting position, in which the discs and plates 28, 32 engage each other with sufficient force to transmit torque from the inner friction discs 28 to the outer pressure plates 32.

The dog clutch assembly 26 provides a selective mechanical coupling between the hub 18 and the housing 22. The dog clutch assembly 26 is movable between a disengaged position to an engaged position in which the dog clutch assembly 26 mechanically locks the hub 18 to the housing 22. According to the exemplary embodiment of FIG. 2, the dog clutch assembly 26' may include a first dog clutch element 36 splined via splines 20' to the hub 18 and a second dog clutch element 38 commensurately splined to the housing 22'. The first and second dog clutch elements 36, 38 have complementary axially facing, radially oriented, locking surfaces 40, 42 configured to form a mechanically locked connection when engaged. A dog arm 44 may be slidably interactive with the second dog clutch element 38 via a spring 46. Until axially loaded, the spring 46, disposed between the dog arm 44 and the second dog clutch element 38, is adapted to be to hold the dog arm 44 in a retracted position, hence spaced from the first dog clutch element 36. When a force is applied to the dog arm 44 sufficient to collapse the spring 46, the dog arm 44 will slide toward the first dog clutch element 36 to drive it into engagement with the second dog clutch element 38, thereby mechanically locking the hub 18 to the housing 22.

Figure 2:
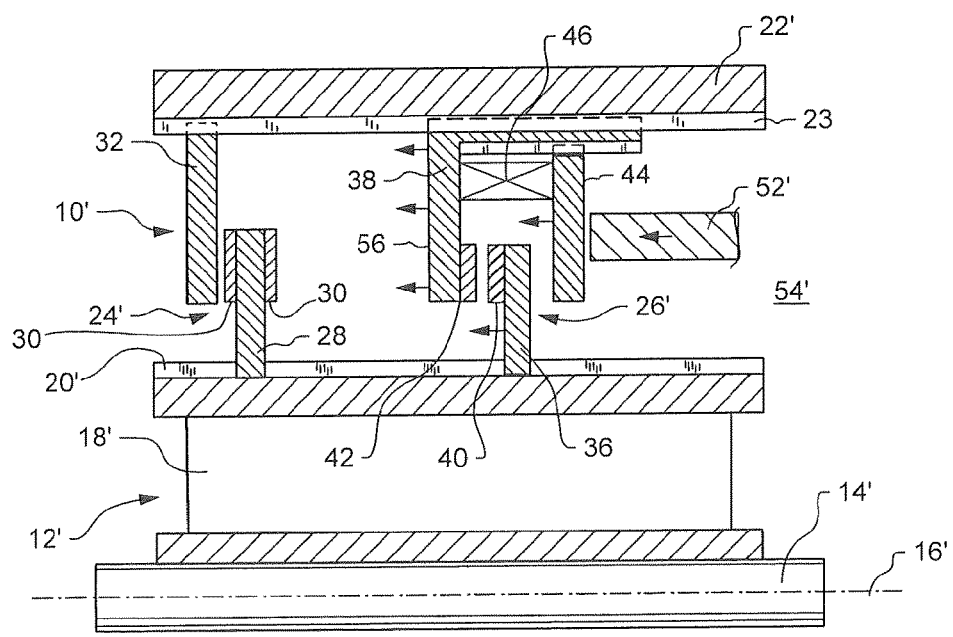
FIG. 2 is a schematic representation of a similar embodiment of a composite clutch that be constructed according to the present disclosure.

Continuing reference to now both FIGS. 1 and 2, in the described embodiments an actuator assembly 50 is provided for serially first actuating the friction clutch assembly 24, 24' and then actuating the dog clutch assembly 26, 26'. Thus in both illustrated embodiments, the actuator assembly 50 may include a hydraulic piston 52, 52' controllably moved by pressure of hydraulic fluid disposed in a chamber 54 situated between the piston 52, 52' and the housing 22, as will be appreciated by those skilled in the art.

The above-described composite clutch 10 provides clutching capability in both a friction clutch mode and a dog clutch mode within first and second operational ranges of torques, respectively. During operation, the actuator piston 52, 52' is adapted to engage the dog arm 44. Initially, the force generated by the piston 52, 52' will not exceed the force of the spring 46, and therefore the second dog clutch element 38 will be translated axially toward the friction clutch assembly 24, 24'. If the distance between the friction clutch assembly 24, 24' and dog clutch assembly 26, 26' is sufficiently large as shown in FIG. 2, the dog arm 44 will also engage and slide the first dog clutch element 36 toward the friction clutch assembly 24, 24'. Ultimately, a face 56 of the second dog clutch element 38 will engage an inner friction clutch plate 28, as shown, to thereby drive the inner and outer discs and plates 28, 32 into engagement. Thus, in the illustrated embodiment, the second dog clutch element 38 also functions as a pressure plate, similar to the pressure plate 32. With sufficient piston force, the inner friction clutch plates 28 will ultimately engage the outer friction clutch plates 32 to transfer torque. Initially, the outer pressure plates 32 will experience significant slippage with respect to the inner friction discs 28. Additional hydraulic piston force will, however, reduce the slippage and increase amount of torque transfer. The piston force may be further increased to a level at which it exceeds the force of the spring 46, thereby causing the dog arm 44 to drive the first dog clutch element 36 into engagement with the second dog clutch element 38. At that point, the hub 18 and housing 22 will become mechanically locked together via the dog clutch assembly 26, 26'.

Figure 3:
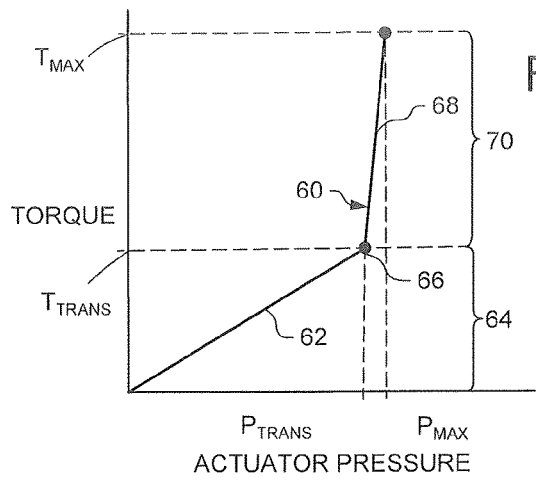
FIG. 3 is an exemplary graphical plot of torque vs. actuator pressure for a composite clutch constructed according to the present disclosure.

A torque gain curve 60, representative of a full spectrum of operational torques that may be provided by the composite clutch 10, 10', is provided in FIG. 3 to graphically illustrate a relationship between actuator pressure and torque as produced by the composite clutch 10, 10'. A lower operational range of torques 64, reflected by a first or slightly inclined segment 62, represents a friction clutch mode of operation. Beyond a transition point 66, the composite clutch 10, 10' transitions to the dog clutch mode of operation, as represented by a second, more steeply inclined, segment 68. The dog clutch mode is employed during a second or higher operational range of torques 70. For the embodiments disclosed, the transition point 66 is determined primarily by the force of the spring 46, which may conveniently be selected and adjusted to achieve a desired result.

Continuing reference to FIG. 3, the relatively smaller slope of the first segment 62 reveals that the disclosed composite clutch 10, 10' is designed to be less sensitive to changes in actuator pressure within the lower operational range of torques 64. In the disclosed embodiments, it will then be apparent to those skilled in the art that sensitivity and hence controllability issues may diminish for the higher torques, and thus the dog clutch assembly 26, 26' may accordingly be more advantageously employed to accommodate the higher operational range of torques 70.

Figure 4A:
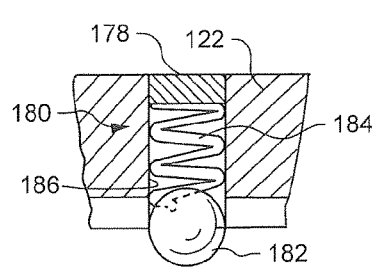
FIG. 4A is a schematic representation of a portion of the composite clutch embodiment of FIG. 4.
Figure 4:
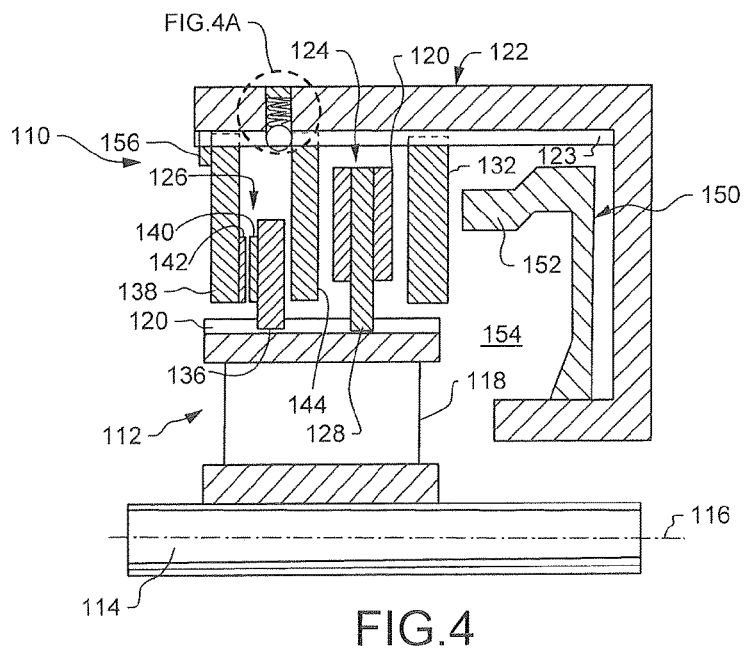
FIG. 4 is a schematic representation of an additional embodiment of a composite clutch constructed according to the present disclosure.

Referring now to FIGS. 4 and 4A, another embodiment of a composite clutch 110 is configured to eliminate the need for the spring 46, as well as to avoid any inherent necessity of one clutch assembly having to physically slide a substantial distance axially toward the other clutch assembly for its actuation, as required in the embodiments of FIGS. 1 and 2. As configured in FIG. 4, it may first be appreciated that a friction clutch assembly 124, and an axially juxtaposed mechanically locking clutch, such as a dog clutch assembly 126, share axially reversed positions in the composite clutch 110, in contrast to the composite clutch embodiments 10, 10' of FIGS. 1 and 2.

The composite clutch 110 may also be configured in a transmission 112 for transmitting an operational range of torques (60) from a driving member (118) to a driven member (122). Fundamentally, the operating characteristics of the composite clutch 110 are similar to those of the earlier described composite clutch embodiments, with like elements being substantially correspondingly numbered, albeit in a 100-series format. However, supported within the driven housing member 122 of an associated transmission 112, is a spring-loaded detent 180 configured to interact with a cooperating dog clutch element 144 of the composite clutch 110. The dog clutch element 144 operates analogously to the outer friction clutch plate 38 of the composite clutch 10' of FIG. 2, in that the dog clutch element 144 also doubly functions as a friction clutch component.

Although only one radially oriented detent 180 is depicted in detail in FIG. 4A, a plurality of such detents 180 may be uniformly spaced circumferentially about the interior wall defined by the housing 122. Thus, by way of example, with use of two detents, coaxially located, but circumferentially spaced, the angular spacing between them would be 180 degrees, while with three detents the inter-detent spacing would be 120°, etc. Alternatively, the detents may be positioned in a non-uniformly spaced arrangement as, by way of example only, positioned in closely spaced pairs or clusters (not shown) about the circumference of the housing 122.

Collectively, the plurality of detents may operate as a system of detents. In fact, the actual number of detents employed in any given application can be a function of amount of counteracting or resistive force desired to achieve the transition between modes. Indeed, any such required resistive force would determine the actual transition or inflection point 66 on the torque gain curve (FIG. 3).

As disclosed, each individual detent 180 includes a fixed spring reaction member 178 and a coacting ball 182 urged radially inwardly by a spring 184, the spring being interposed between the ball and the reaction member. All elements of the detent 180 are contained within an aperture 186 that extends radially within the interior of the housing 122. The spring 184 is thus configured and positioned to radially load the ball against the reaction member 178 upon which it is seated. The ball is secured within the inside of the aperture, i.e. from falling into the interior of the housing 122, by a washer (not shown). For this purpose, the washer has an internal diameter slightly smaller than that of the ball 182. Alternatively, and although not described herein, other means of securing balls 182 within such apertures may be employed.

Figure 5:
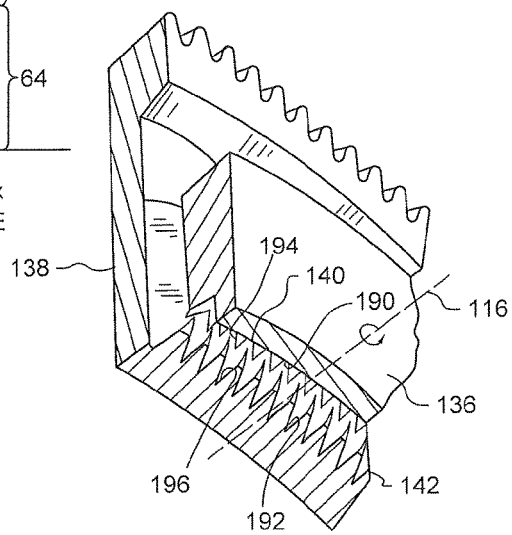
FIG. 5 is a perspective view of a fragmented pair of dog clutch elements that may be utilized in the composite clutch embodiment of FIG. 4.

Referring now to FIG. 5, fragmentary portions of the first and second dog clutch elements 136 and 138 of the composite clutch 110 are shown in perspective view during an incipient or initial engagement phase of their complementary locking surfaces 140 and 142 during the dog clutch mode, represented by the higher range of operating torques 70 as depicted in FIG. 3. The latter locking surfaces 140, 142 axially face one another, and contain complementary V-grooves 190, 192 as shown. The V-grooves 190, 192 facilitate physical separation of the locking surfaces 140, 142 upon disengagement of the composite clutch 110 while under torque load. The V-grooves 190,192 contribute to successful disengagement of dog clutch elements 136, 138 by providing a plurality of miniature cooperating angled sliding surfaces 194, 196. The V-grooves 190, 192 may have a variety of orientations including substantially circumferential as shown. Whether the grooves are fully radially oriented, or angled in an orientation between radial and circumferential, at least some radial angled component is suggested to facilitate satisfactory release under torque loads. Actual amount of radial component will depend on the particular application. Finally, the V-grooves may be designed in a variety of sizes; hence, they may be fine or course, depending upon application.

Together, the system of detents 180 and the complementary V-grooves 190, 192 may enhance transition of the composite clutch 110 between friction and dog clutch operating modes, as well as enhancing the physical disengagement of the composite clutch 110 upon release from the dog clutch mode.

In addition, the friction clutch assembly 124 and dog clutch assembly 126 can be axially positioned to be much physically closer together, compared to the friction and dog clutch assemblies 24, 24' and 26, 26' of FIGS. 1 and 2. Those earlier described clutch assemblies require axial spacing at least equal to the amount distance required to collapse the spring 46 (FIG. 2), because the respective clutch assemblies must slide toward each other at least that distance. Conversely, use of the spring-loaded detents 180 eliminates the spring 46. Since considerably less axial spacing is required, the clutch assemblies 124, 126 may be configured with significantly reduced axial dimensions.

Referring now back to FIG. 4, the physical operation of the composite clutch 110 may be described as follows. In order to initiate engagement of the composite clutch, the actuator assembly 150 is hydraulically moved leftwardly, and the piston 152 is configured to bear against the outer pressure plate 132 of the friction clutch assembly 124 as shown. In turn, the outer pressure plate 132 moves leftward until it contacts the inner friction discs 128, sandwiching the inner friction discs 128 against the dog arm 144 of the dog clutch assembly 126. In the composite clutch 110, it will be noted that the friction discs 128 have friction pads 130 secured to both sides of the discs 128, as shown.

During the friction clutch mode, the friction clutch 124 accommodates the lower range of torques 64 (FIG. 3) without any engagement of the dog clutch 126, because while within the lower operating range of torque 64 the actuator pressure against detents 180 will be insufficient to collectively depress the detent balls 182 into the housing 122.

Once the actuator pressure has reached the transition point 66, however, the balls 182 of the detents 180 will be sufficiently forced radially against the detent springs 184, urging the balls radially into the housing 122 to then permit the dog arm 144, which is directly juxtaposed against the balls 182 of the detents 180, to move axially leftwardly beyond the balls. Continued actuator pressure will then cause the first dog clutch element 136 to lockingly engage the second dog clutch element 138. An axially loaded reaction member 156 shown secured to the hub 122 is adapted to provide a retention force sufficient to retain the pressure plates within the composite clutch 110 under full actuator load.

Although the composite clutch 110 as described herein is intended to capture the spirit and essence of the immediate disclosure, alternative structures may also fall within the scope hereof. For example, the friction clutch 110 may incorporate any number of clutch plates, and may have, for example, at least two separate friction clutch units in addition to the dog clutch unit described. In addition, the spring-loaded detent 180 may be configured in forms other than that inclusive of a ball and linear spring radially situated as shown in FIG. 4A. By way of example only, a leaf spring module, and/or other spring system or device, may be employed in the clutch 110, as those skilled in the art will appreciate.

A method of making a composite clutch (110) for transmitting an operational range of torques (60) from a driving member (114) to a driven member (122) may include the steps of:

configuring a friction clutch assembly (124) to include a first friction clutch element (128) adapted to be coupled to the driving member (114) and a second friction clutch element (132) adapted to be coupled to the driven member (122);

configuring a dog clutch assembly (126) to include a first dog clutch element (136) adapted to be coupled to the driving member, a second dog clutch element (138) adapted to be coupled to the driven member;

placing a dog arm (144) in axial juxtaposition with the second dog clutch element (138), and providing at least one spring-loaded detent (180) between the dog arm (144) and the second dog clutch element (138), the detent being configured to bias the dog arm (144) away from the first dog clutch element (136) during a lower operating range of torques (64);

coupling an actuator assembly (150) to the dog clutch assembly (126) to operate through the friction clutch assembly (124); and configuring the actuator assembly to force the dog arm beyond the detents to cause the composite clutch to transition to a higher operating range of torques (70).

The described method may further include the step of configuring the dog arm (144) to be juxtaposed against the detent (180), and configuring the first and second friction clutch members (128, 132) to be movable from an unengaged position to a torque transmitting position corresponding to a first portion (64) of the operational range of torques (60) under which a force supplied by the actuator assembly (150) is less than required to bias the dog arm (144) and thereby move the dog arm axially beyond the detent (180).

In addition, the method may also include the step of configuring the dog clutch assembly (126) to include first and second dog clutch elements (136, 138) adapted to be movable from a disengaged position to an engaged position corresponding to a second portion (70) of the operational range of torques (60) under which a force supplied by the actuator assembly (150) becomes greater than required to compress the detent (180)

Finally, the method may also include the step of configuring the first and second dog clutch elements (136, 138) to include complimentary locking surfaces (140, 142), and forming each locking surface to include V-grooves (190, 192) to facilitate release of the dog clutch elements while under torque load.

INDUSTRIAL APPLICABILITY

The disclosed composite clutch may advantageously be used in a transmission of a vehicle, in a machine, or in another device. The clutch includes friction and dog clutch assemblies configured to facilitate transition between two distinct friction and dog clutch operating modes. The combination of a spring loaded detent system and the use of V-grooves in coacting dog clutch elements may improve controllability, particularly during transition between modes, as well as between composite clutch engagement and disengagement. The detent system may permit smaller axial dimensions of the composite clutch.

Finally, the disclosed composite clutch may be coupled to either a simple hub or to a one-way clutch to achieve several additional operational modes not described herein. Such modes, by way of example only, may include a composite clutch that may be either 1) locked in one direction, and free-wheeling in the opposite direction; 2) a low torque friction clutch in one direction; 3) a low torque friction clutch in both directions; and (4) a mechanically locked clutch in both directions.

What is claimed is:

1. A composite clutch for transmitting an operational range of torques from a driving member to a driven member, comprising:

a friction clutch assembly including first friction clutch elements coupled to the driving member and second friction clutch elements coupled to the driven member;

a dog clutch assembly including a first dog clutch element coupled to the driving member, a second dog clutch element coupled to the driven member, a dog arm coupled to the driven member in axial juxtaposition with the second dog clutch element and axially movable relative to the first dog clutch element and the second dog clutch element, at least one spring-loaded detent contained within an aperture that extends radially within the interior of the driven member, axially stationary with respect to the driven member and disposed between the dog arm and the second dog clutch element, the detent configured to engage the dog arm and prevent the dog arm from forcing the first dog clutch element into engagement with the second dog clutch element during a lower operating range of torques; and an actuator assembly operatively coupled to the dog clutch assembly via the friction clutch assembly, the actuator assembly configured to force the dog arm beyond the detent and into engagement with the first dog clutch element to force the first dog clutch element into engagement with the second dog clutch element to thereby cause the composite clutch to transition to a higher operating range of torques.

2. The composite clutch of claim 1, in which the first and second friction clutch members are movable from an unengaged position to a torque transmitting position while a force supplied by the actuator assembly is less than a force required to bias the dog arm to cause axial movement thereof beyond the detent.

3. The composite clutch of claim 2, in which the force supplied by the actuator assembly corresponds to a first portion of the operational range of torques.

4. The composite clutch of claim 1, in which the first and second dog clutch elements are movable from a disengaged position to an engaged position when a force supplied by the actuator assembly becomes greater than a force required to compress the detent, corresponding to a second portion of the operational range of torques.

5. The composite clutch of claim 1, in which the first and second dog clutch elements include complimentary locking surfaces, each locking surface defining V-grooves to facilitate release of the dog clutch elements while under torque load.

6. The composite clutch of claim 5, in which the actuator assembly is configured to force the dog arm against the first dog clutch element to move the complimentary locking surfaces into engagement during operation within the higher operating range of torques.

7. A transmission clutch system configured for transmitting an operational range of torques from a driving member to a driven member, comprising:
   a composite clutch having a friction clutch assembly and a mechanically locking clutch assembly, the composite clutch being operable in a friction clutch mode across a first portion of the operational range of torques, and operable in a mechanically locking mode across a second portion of the operational range of torques;
   an actuator assembly including an actuator piston operatively coupled in series, first to the friction clutch assembly, and secondly to the mechanically locking clutch assembly; and
   a spring-loaded detent contained within an aperture that extends radially within the interior of the driven member and axially stationary with respect to the driven member, the detent being operatively configured to separate the first portion of the operational range of torques from the second portion of the operational range of torques.

8. The transmission clutch system of claim 7, in which the friction clutch assembly includes first and second friction clutch members movable from an unengaged position to a torque transmitting position, and in which the mechanically locking clutch assembly includes a dog arm juxtaposed against the detent, such that when the clutch system is operating within the first portion of the operational range of torques, a force supplied by the actuator assembly is less than required to bias the dog arm to cause axial movement thereof beyond the detent.

9. The transmission clutch system of claim 7, in which the mechanically locking clutch assembly include first and second dog clutch elements movable from a disengaged position to an engaged position when a force supplied by the actuator assembly becomes greater than required to compress the detent, corresponding to a second portion of the operational range of torques.

10. The transmission clutch system of claim 9, in which the first and second dog clutch elements include complimentary locking surfaces, each locking surface defining V-grooves to facilitate release of the dog clutch elements while under torque load.

11. The transmission clutch system of claim 10, in which the actuator assembly is configured to force the dog arm against the first dog clutch element to move the complimentary locking surfaces into engagement during operation within the higher operating range of torques.

12. A method of making a composite clutch for transmitting an operational range of torques from a driving member to a driven member, the method comprising the steps of:
   configuring a friction clutch assembly to include a first friction clutch element adapted to be coupled to the driving member and a second friction clutch element adapted to be coupled to the driven member;
   configuring a dog clutch assembly to include a first dog clutch element adapted to be coupled to the driving member, a second dog clutch element adapted to be coupled to the driven member;
   placing a dog arm in axial juxtaposition with the second dog clutch element and axially movable relative to the first dog clutch element and the second dog clutch element, and providing at least one spring-loaded detent between the dog arm and the second dog clutch element, the detent being contained within an aperture that extends radially within the interior of the driven member and axially stationary with respect to the driven member, and configured to bias the dog arm away from the first dog clutch element during a lower operating range of torques;
   coupling an actuator assembly to the dog clutch assembly to operate through the friction clutch assembly; and
   configuring the actuator assembly to force the dog arm beyond the detents and into engagement with the first dog clutch element to cause the composite clutch to transition to a higher operating range of torques.

13. The method of claim 12, further including the step of configuring the dog arm to be juxtaposed against the detent, and configuring the first and second friction clutch members to be movable from an unengaged position to a torque transmitting position corresponding to a first portion of the operational range of torques under which a force supplied by the actuator assembly is less than required to bias the dog arm and thereby move the dog arm axially beyond the detent.

14. The method of claim 12, further including the step of configuring the dog clutch assembly to include first and second dog clutch elements adapted to be movable from a disengaged position to an engaged position corresponding to a second portion of the operational range of torques under which a force supplied by the actuator assembly becomes greater than required to compress the detent.

15. The method of claim 12, further including the step of configuring the first and second dog clutch elements to include complimentary locking surfaces, and forming each locking surface to include V-grooves to facilitate release of the dog clutch elements while under torque load.

* * * * *